United States Patent [19]

Bürger

[11] Patent Number: 5,476,021
[45] Date of Patent: Dec. 19, 1995

[54] MOTOR VEHICLE TOOTHED CHANGE TRANSMISSION SHIFT DEVICE

[75] Inventor: Hans Bürger, Esslingen, Germany

[73] Assignee: Mercedes-Benz AG, Germany

[21] Appl. No.: 218,590

[22] Filed: Mar. 28, 1994

[30] Foreign Application Priority Data

Mar. 31, 1993 [DE] Germany ............... 43 10 450.9

[51] Int. Cl.⁶ ............... F16H 61/24; B60K 20/00; G05G 5/20; B60Q 1/22
[52] U.S. Cl. ............... 74/475; 74/527
[58] Field of Search ............... 74/475, 527

[56] References Cited

U.S. PATENT DOCUMENTS

| | | | |
|---|---|---|---|
| Re. 32,125 | 4/1986 | Von Kaler et al. | 74/371 |
| 3,164,030 | 1/1965 | Fodrea et al. | |
| 3,811,020 | 5/1974 | Johnson et al. | 200/61.88 |
| 3,857,299 | 12/1974 | Morrison | 74/473 R |
| 4,031,977 | 10/1977 | Grosseau | 180/77 R |
| 4,070,914 | 1/1978 | Reinhardt et al. | 74/475 |
| 4,273,004 | 6/1981 | Morrison et al. | 74/473 R |
| 4,377,951 | 3/1983 | Magg et al. | 74/477 |
| 4,458,550 | 7/1984 | Takahashi | 74/473 R |
| 4,531,422 | 7/1985 | Yarnell | 74/475 |
| 4,561,321 | 12/1985 | Yarnell | 74/473 R |
| 4,570,776 | 2/1986 | Iwashita et al. | 192/114 R |
| 4,722,237 | 2/1988 | McNinch, Jr. | 74/346 |
| 4,785,681 | 11/1988 | Kuratsu et al. | 74/339 |
| 4,821,607 | 4/1989 | Kawai | 74/866 |
| 4,920,815 | 5/1990 | Reynolds | 74/335 |
| 5,031,472 | 7/1991 | Dutson et al. | 74/335 |
| 5,038,632 | 8/1991 | Watson | 74/475 |
| 5,109,722 | 5/1992 | Hufnagle et al. | 74/371 |
| 5,140,866 | 8/1992 | Schetter et al. | 74/473 R |
| 5,263,386 | 11/1993 | Campbell et al. | 74/569 |

FOREIGN PATENT DOCUMENTS

| | | |
|---|---|---|
| 7041459 | of 0000 | Germany . |
| 4110012 | of 0000 | Germany . |
| 7735295 | of 0000 | Germany . |

*Primary Examiner*—Charles A. Marmor
*Assistant Examiner*—David M. Fenstermacher
*Attorney, Agent, or Firm*—Evenson, McKeown, Edwards & Lenahan

[57] ABSTRACT

A shift device for a toothed change transmission of a motor vehicle has a resilient pressure point which is made capable of being felt on the manual-shift lever during the selection of a specific shift slot. More specifically, a shift finger and a pressure pin are movable relative to one another. An abutment sleeve is operatively arranged between the abutment and the associated spring end of the pressure-point spring and is arranged displaceably in the directions of the main axis both relative to the housing part and relative to the pressure pin. The abutment sleeve has a first axial stop in bearing contact on the abutment when the shift finger is located in the second shift plane and a second axial stop. The pressure pin has a corresponding axial stop. The two axial stops are in mutual bearing contact when the shift finger is in a first region of the selection plane limited by the first and the third shift plane. The shift finger and the abutment sleeve each have a cam, in mutual engagement when the shift finger is located in a second region of the selection plane limited by the second and by the third shift plane.

4 Claims, 3 Drawing Sheets

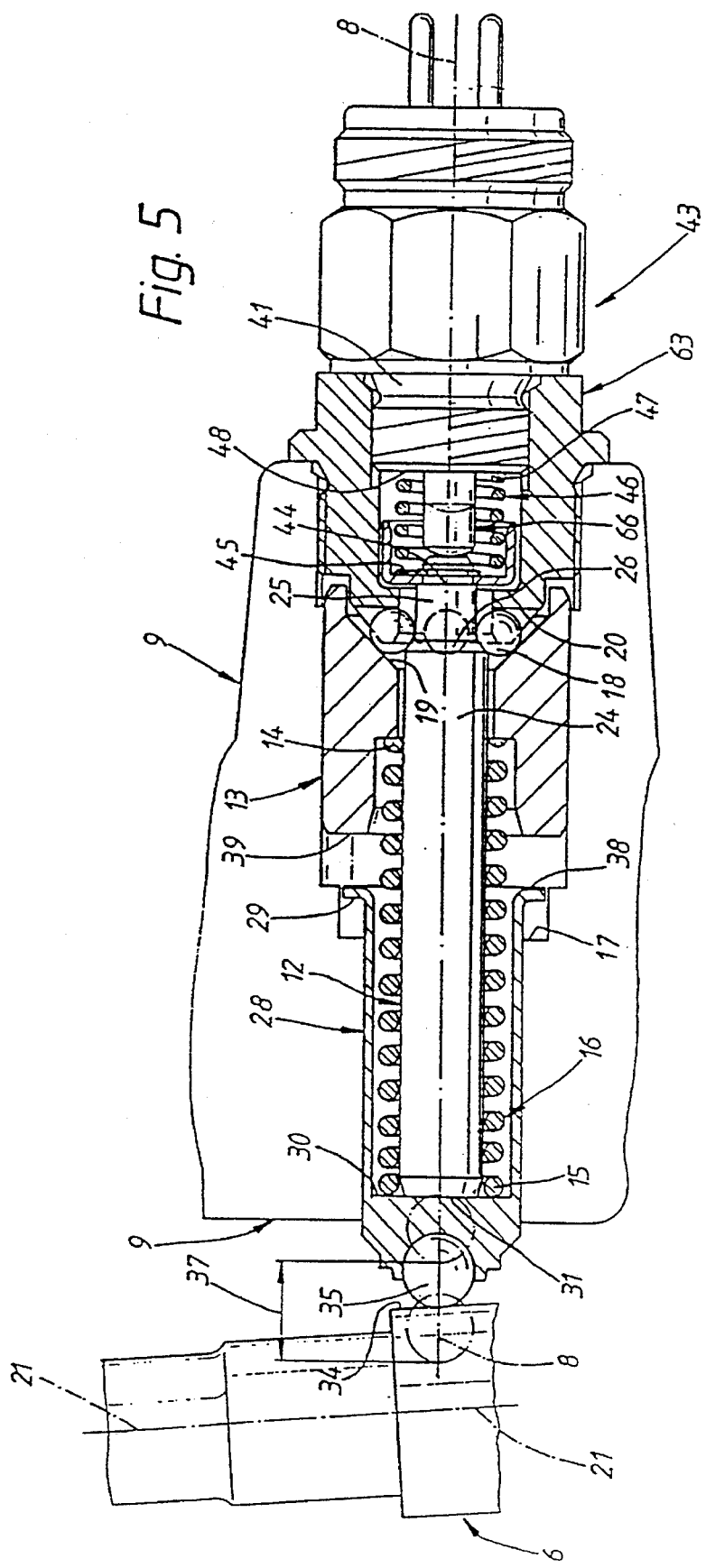

5,476,021

MOTOR VEHICLE TOOTHED CHANGE TRANSMISSION SHIFT DEVICE

BACKGROUND AND SUMMARY OF THE INVENTION

The present invention relates to a shift device, and more particularly, to a shift device for a toothed change transmission of a motor vehicle, and, more particularly, to a device comprising a manual-shift lever, a shift finger operatively connected with the manual shift lever such that actuation of the manual-shift lever displaces the shift finger both in a selection plane containing a geometrical main axis for a housing part and in the shift planes of the housing part lying transversely to the selection plane, and, with respect of the main axis, a pressure pin and a reaction sleeve.

In a known shift device of the type described in U.S. Pat. No. 3,164,030 (see, in particular, FIG. 4), the shift finger and the pressure pin are fixed relative to one another in terms of motion. As a result, the pressure-point spring, via the inclined face of the reaction sleeve and the reaction balls at the same time supported centripetally on the narrow pin portion, generates a constant frictional resistance on the manual-shift lever when the shift finger is actuated in the region of the selection plane limited by the first and the second shift plane. This device also requires a special return spring which is arranged concentrically on the wide pin portion and supported axially between the reaction sleeve, and an abutment of the wide pin portion to return the pressure pin out of the position in the region of the first shift plane.

An object of the present invention is to prevent in a shift device of the known type the occurrence of a frictional resistance exerted on the manual-shift lever by the reaction balls when the manual-shift lever is not actuated in order to select the third shift slot, i.e. in order to displace the shift finger into the third selection plane.

The foregoing object has been achieved in an advantageous way by arranging the shift finger and the pressure pin movably relative to one another in the directions of the main axis. An abutment sleeve is operatively arranged between the abutment and the associated spring end of the pressure-point spring and is arranged displaceably in the directions of the main axis both relative to the housing part and relative to the pressure pin. The abutment sleeve has a first axial stop in bearing contact on the abutment when the shift finger is located in the second shift plane and a second axial stop. The pressure pin has a corresponding axial stop. The two axial stops are in mutual bearing contact when the shift finger is in a first region of the selection plane limited by the first and the third shift plane. The shift finger and the abutment sleeve each have a cam, in mutual engagement when the shift finger is located in a second region of the selection plane limited by the second and by the third shift plane.

In the shift device according to the present invention, the pressure pin remains in a position of readiness relative to the housing part, fixed by the inclined faces and the radial guide face of the housing part, when the shift finger is located in the region of the selection plane limited by the first and the second shift plane. Thus, a frictional resistance cannot be generated by the reaction balls when the manual-shift lever is being actuated. A specific stop position for the abutment sleeve cooperating with the shift finger is provided when the shift finger is located in the third shift plane.

The present invention also provides for the return of the pressure pin out of the position in the region of the third shift plane into the position of readiness in the region of the first shift plane by using only the switching spring of a reversing-light switch arranged coaxially to the main axis and actuatable, i.e. switched on, by the pressure pin, instead of the special return spring required in aforementioned U.S. Pat. No. 3,164,030.

Thus, even though in the known shift device, the return spring, like the pressure-point spring, generates a constant frictional resistance on the manual-shift lever via the inclined face of the reaction sleeve and the reaction balls supported centripetally on the narrow pin portion, when the shift finger is actuated in the region of the selection plane limited by the first and the second shift plane, the present invention also prevents the occurrence of a frictional resistance exerted on the manual-shift lever by the reaction balls, when the manual-shift lever is not actuated in order to select the third shift slot, i.e. in order to displace the shift finger into the third selection plane, because the switching spring used as a return spring is, in principle, ineffective relative to the manual-shift lever in the respective region of the selection plane.

Should the spring force off the switching spring of the reversing-light switch be insufficient for the return of the pressure pin in the shift device according to the invention, however, a return spring can be provided either alone or in addition to the aforementioned switching spring.

Consequently, the present invention also prevents the occurrence of a frictional resistance which can be exerted on the manual-shift lever by the reaction balls, when the manual-shift lever is not actuated in order to select the third shift slot (i.e. in order to displace the shift finger into the third selection plane) because the reaction balls remain uninfluenced by the return spring.

BRIEF DESCRIPTION OF THE DRAWINGS

These and other features, objects and advantages of the present invention will become more readily apparent from the following detailed description thereof when taken in conjunction with the accompanying drawings wherein:

FIG. 5 is a second embodiment of the shift device according to the present invention in a position of the manual-shift lever identical to that of the representation in FIG. 2.

DETAILED DESCRIPTION OF THE DRAWINGS

Figure 1:
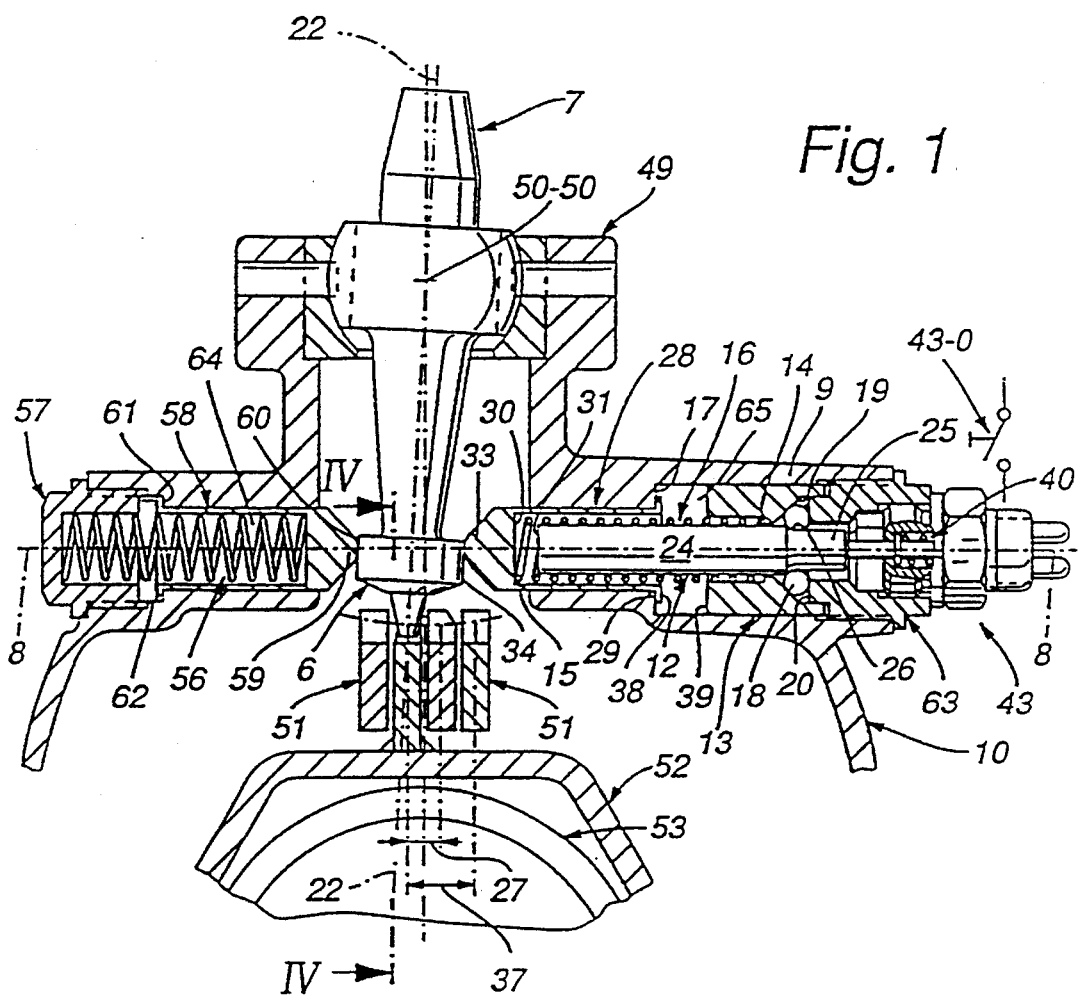
FIG. 1 is a vertical cross-sectional view through a shift device according to the present invention in a selection plane containing a geometrical main axis, along the line I—I of hereinafter described FIG. 4, with the shift device being in a non-actuated rest position.

Referring now to FIGS. 1 to 4, a shift finger 6 is mounted in an upper housing part 9 of a gear case 10 of a toothed change transmission of the countershaft type so as to be pivotable by way of a bearing arrangement 49 about a geometrical pivot axis 50—50 perpendicular to the plane of the drawing, for coupling to one of four shift rods 51, and about a respective pivot axis perpendicular to the pivot axis 50—50, for actuating the respective shift rod 51 which engages in a known way via a shift fork 52 into the sliding shift sleeve 53 of a gear-change shifting clutch for coupling a gearwheel to its transmission shaft. The lower end of the shift finger 6 has a crowned engagement member 54 for articulated engagement into a coupling groove 55 provided on the top side of the respective shift rail 51.

The center of articulation of the outer cam 59 is located, in respect of the shift finger 6, between the lower engagement member 54 and an upper connecting journal 7*, which fastens the upper lever part of the manual-shift lever and the upper lever part having the shift grip (not shown in any more detail for ease of understanding and illustration).

Figure 4:
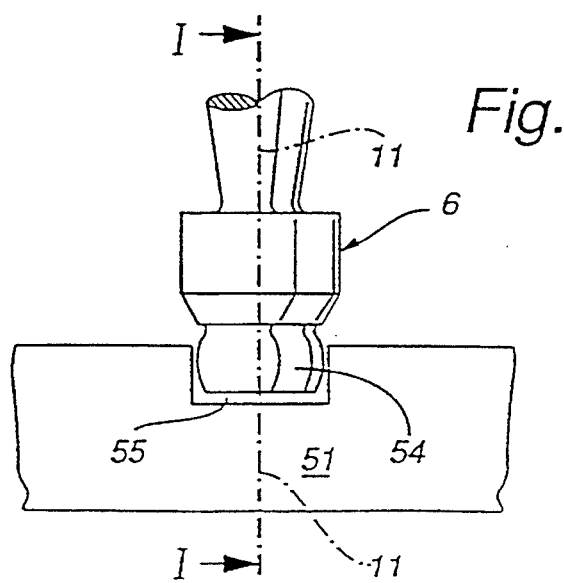
FIG. 4 is a vertical partial cross-sectional longitudinal view through the shift device along the line IV—IV in FIG. 1.

In the shifting state shown in FIGS. 1 and 4, the shift finger is located at the transition between a selection plane 11—11 of the housing part 9 identical to the drawing plane of FIGS. 1 to 3 and 5 and a second shift plan 22—22 of the housing part 9 essentially perpendicular to the selection plane. In this shift plane 22—22, in which the shift finger 6 engages with its engagement member 54 into the coupling groove 55 of the shift rod 51 for shifting the third and the fourth forward gear, the shift finger 6 is held by a pressure-point spring 16 and by a return spring 56 which are arranged coaxially relative to a geometrical main axis 8—8 of the housing part 9 lying in the selection plane 11—11 and on both sides of a mid-plane of the housing part 9 containing the center of articulation and located perpendicular to the main axis 8—8.

The return spring 56 is supported, with its spring end located opposite the shift finger 6, on an abutment 57 which is adjustable in its position relative to the mid-plane of the housing part 9 and is configured as a threaded plug which is screwed into a threaded portion of a housing bore 64 of the housing part 9. The housing bore 64 receives the spring 56. The other spring end of the return spring 56 is supported on an abutment sleeve 58 which is coaxially guided in the housing bore 64 so as to be axially displaceable in relation to the main axis 8—8.

The sleeve end of the abutment sleeve 58 facing the mid-plane of the housing part 9 has a closed bottom with an outer cam 59 which cooperates with a corresponding cam 60 on the collar-like extension of the shift finger 6. The collar-like extension is located between the engagement member 54 and the center of articulation of the bearing arrangement 49. When the shift finger 6 is located in the second shift plane 22—22, the abutment sleeve 58 is supported by a stop 61 on an abutment 62 fixed in terms of motion (i.e. motionally fixed) relative to the housing part 9 in the direction of the main axis 8—8 pointing to the mid-plane of the housing part 9.

The spring end 14 of the pressure-point spring 16 located opposite the mid-plane of the housing part 9 is supported on a reaction sleeve 13 and the other spring end 15 is supported on an abutment sleeve 28 which is guided displaceably in a housing bore 65 of the housing part 9. The housing bore 65 is central relative to the main axis 8—8. The sleeve end of the abutment sleeve 28 located adjacent to the mid-plane of the housing part 9 has a closed bottom with an outer cam 33 which cooperates with a corresponding cam 34 on the collar-like extension of the shift finger 6.

When the shift finger 6 is located in the shift plane 22—22 shown in FIG. 1, abutment sleeve 28 is supported by a first stop 29 on a motionally fixed abutment 17 of the housing part 9 in the first direction of the main axis 8—8 pointing from a first Shift plane 21—21 (FIG. 2) to the second shift plane 22—22.

Figure 3:
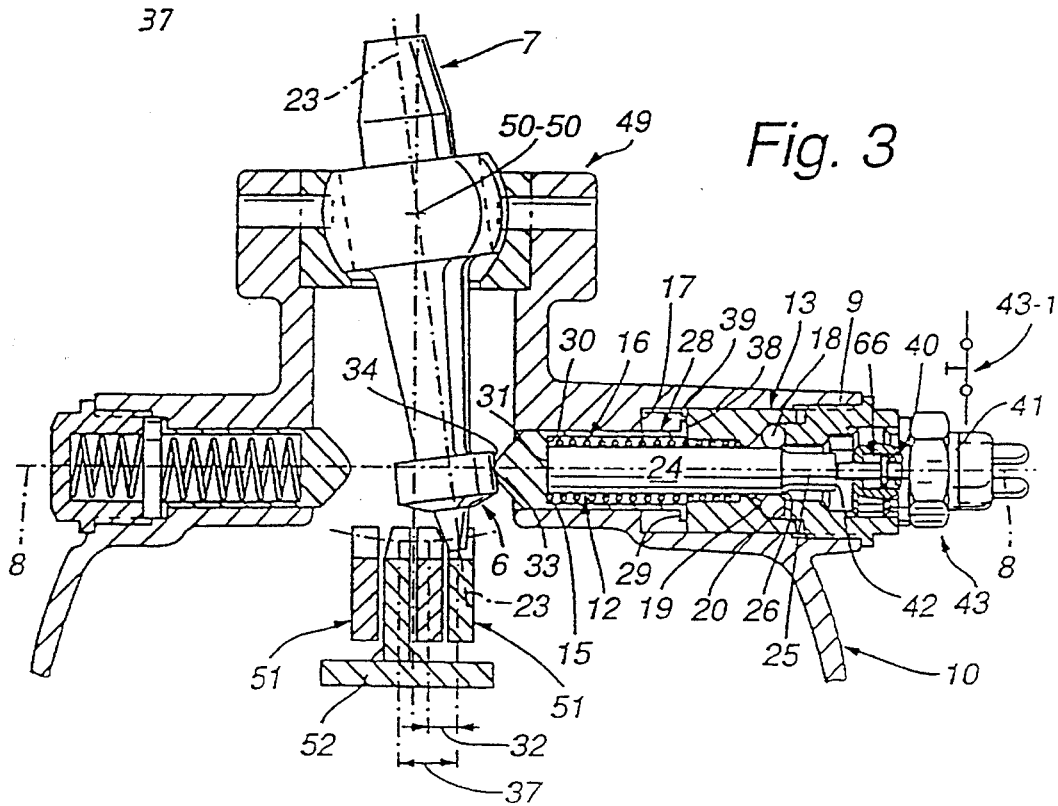
FIG. 3 is a cross-sectional view of the shift device of FIGS. 1 and 4 in a position in which the manual-shift lever is located in the shift slot corresponding to a third shift plane.

Under the effect of the pressure-point spring 16, the reaction sleeve 13 is supported on reaction balls 18 by an annular inclined face 19. The wide end of the face 19 is offset relative to its narrow end in the second direction of the main axis 8—8 pointing away from the shift plane 21— 21 to an adjacent third shift plane 23—23 (FIG. 3). The reaction balls 18 are themselves supported, in the second direction of the main axis 8—8, on a respective radial guide face 20 of a threaded ring 63 which is screwed into a threaded end portion of the housing bore 65 and which is used as a receptacle for a reversing-light switch 43.

A pressure pin 12 is arranged coaxially relative to the main axis 8—8 and projects with its wide portion 24 into the abutment sleeve 28. In the second direction of the main axis 8—8, the wide pin portion 24 merges via an annual inclined face 26 into a narrow pin portion 25, on which, in the illustrated position of the pressure pin 12, the reaction balls are supported in a centripetal (i.e. radially) inward direction relative to the main axis 8—8 under the effect of the pressure-point spring 16.

In this manner, the pressure pin 12 can also be supported via its inclined face 26 on the reaction balls 18 in the second direction of the main axis 8—8. The inner closing-off face of the closed-sleeve end of the abutment sleeve 28 is used as a second stop 30 which cooperates with a corresponding stop 31 in the form of the adjacent end face of the pressure pin 12. These two stops 30, 31 come into mutual bearing contact when the shift finger 6 located in the selection plane 11—11 is actuated by the manual-shift lever into the region of the first shift plane 21—21 (FIG. 2), in which plane the engagement member 54 of the shift finger 6 engages into the coupling groove 55 of that shift rail 51 which is used for shifting the first and the second gear.

Figure 2:
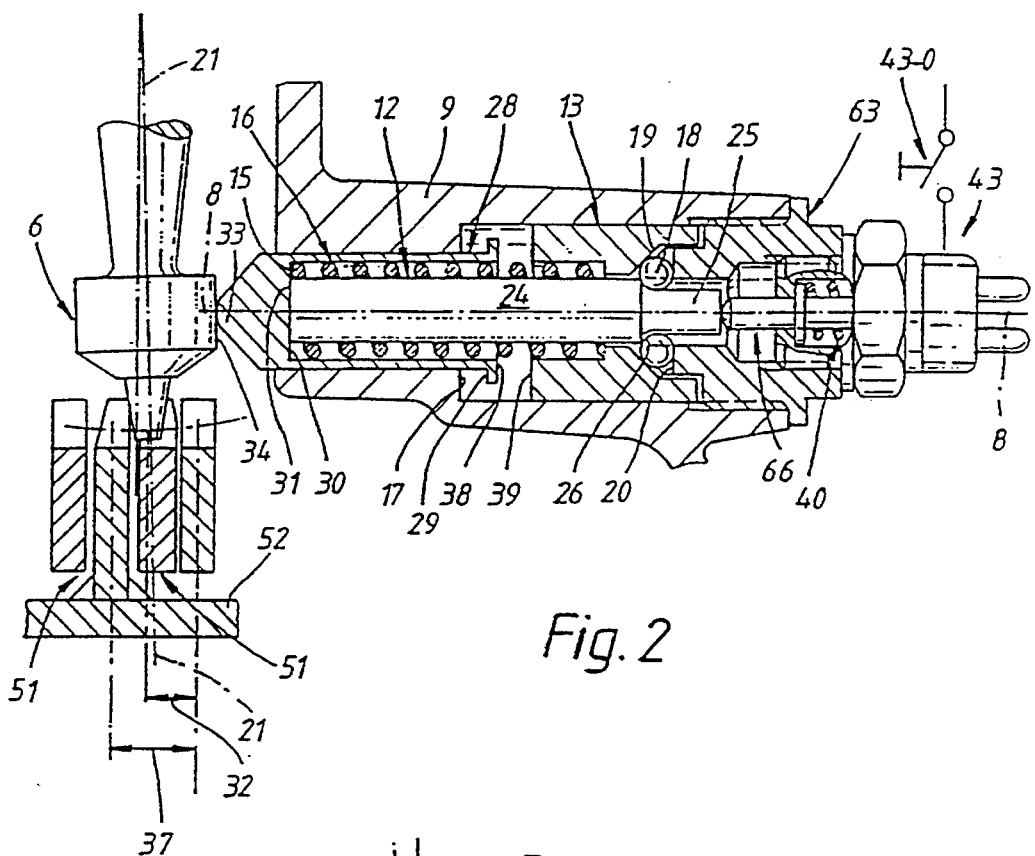
FIG. 2 is a cross-sectional view of the shift device of FIG. 1 in a position in which the manual-shift lever is located in the shift slot corresponding to a first shift plane.

The reversing-light switch 43 is actuated by a switching spring 40 into the OFF position shown in FIGS. 1 and 2 and additionally identified by the switch symbol 43-0. The reversing-light switch 43 possesses, for changing it over into the ON position shown in FIG. 3 and additionally identified by the switch symbol 43-1, a switch tappet 66 which is coaxial to the main axis 8—8. The switch tappet 66 is actuated by a switching cam 42 in the form of the end face of the narrow pin portion 25 of the pressure pin 12 when the shift finger 6 is displaced into the third shift plane 23—23 shown in FIG. 3 as a result of the actuation of the manual-shift lever. In the shift plane 23—23, the engagement member 54 of the shift finger 6 is in engagement with the coupling groove 55 of that shift rail 51 by which the reverse gear is shifted.

During the change-over into the third shift plane 23—23, a pressure point can be felt on the manual-shift lever, because the shift finger 6 displaces the pressure pin 12 in the second direction of the main axis 8—8 via the cams 33, 34 and via the stops 30, 31. The reaction balls 18 are forced radially outwards by the inclined face 26 and, at the same time, the light switch 43 is switched on. The reaction sleeve 13 is displaced in the first direction of the main axis 8—8 by the reaction balls 18 engaging on its inclined face 19, with the result that the pressure-point spring 16 is compressed and a pressure point can be felt on the manual-shift lever.

The end face limiting the abutment sleeve 28 in the second direction of the main axis 8—8 is used as a third stop 38, for which a corresponding stop 39 on the reaction sleeve 13 is provided in the form of the adjacent end face. During the compression of the pressure-point spring 16, these two stops 38, 39 come into mutual bearing contact when the shift finger 6 reaches the third shift plane 23—23, with the reaction balls 18 now being supported or urged centripetally or radially inwards on the wide pin portion 24.

The cams 33, 34 are always in bearing contact when the shift finger 6 is located in the region 37 of the selection plane 11—11 limited by the second shift plane 22—22 and by the third shift plane 23—23. When the shift finger 6 is located in the third shift plane 23—23 and is displaced in the direction of one of the other two shift planes 21—21 and 22—22 via the selection plane 11—11 as a result of the actuation of the manual-shift lever 7, resilient apparatus is required in order to return the pressure pin 12 into its position of readiness, shown in FIGS. 1 and 2. In the readiness position, the pressure pin 12 is supported in the second direction of the main axis 8—8 via its inclined face 26 on the reaction balls 18 supported centripetally on the narrow pin portion 25.

In the shift device according to the invention in the first embodiment shown in FIGS. 1 to 3, the switching spring 40 alone is used for the return of the pressure pin 12 and is supported on the switch housing 41 forming a motionally fixed abutment of the housing part 9. The spring 40 acts on the pressure pin 12 via the switch tappet 66 and the switching cam 42. It is essential that the force exerted by the pressure pin 12 is cut off from the shift finger 6 when the shift finger 6 is located in the region 27 of the selection plane 11—11 limited by the first shift plane 21—21 and by the second shift plane 22—22. Thus, no displacement of the narrow pin portion 25 supporting the reaction balls 18 also takes place in the first direction of the main axis 8—8 and consequently also no frictional resistance generated by the supporting forces of the reaction balls 18 can occur on the manual-shift lever.

The second embodiment of the shift device according to the invention shown in FIG. 5 differs from the first embodiment in that the cam of the abutment sleeve 28 cooperating with the cam 34 of the shift finger 6 is provided in the form of a ball 35 which is mounted rotatably in a spherical socket of the abutment sleeve 28. For the return of the pressure pin 12, an additional return spring 46 is used and is received in the central orifice of the threaded ring 63. The spring 46 is supported, in the first direction of the main axis 8—8, with one spring end 45, via a spring plate on a radial extension 44 of the narrow pin portion 25 of the pressure pin 12 and, in the second direction of the main axis 8—8, with its other spring end 47, on the inner end face 48 of the screw connection of the switch housing 41 of the reversing-light switch 43. The second embodiment is otherwise identical in configuration, arrangement and mode of operation to the first embodiment. For that reason, the same reference numerals as in the first embodiment are used for identical features, so that, for the remainder of the description of the second embodiment, reference can be made to the relevant description of the first embodiment.

The shift device according to the second embodiment shown in FIG. 5 is illustrated in the same state as the first embodiment in FIG. 2, i.e. the shift finger 6 is located in the first shift plane 21—21 for shifting the first and second gears, so that, in addition to the cams 34, 35 of the shift finger 6 and abutment sleeve 28, the respective stops 30, 31 of the abutment sleeve 28 and pressure pin 12 are also in mutual bearing contact.

As described with regard to the first embodiment, during the displacement of the shift finger 6 into the third shift plane 23—23, the pressure pin 12, via its inclined face 26, forces the reaction balls 18 radially outwards, and, at the same time, actuates the switch tappet 66 of the reversing-light switch 43, with both the switching spring (not shown) and the return spring 46 being compressed. Reaction balls 18 actuate the reaction sleeve in the first direction of the main axis 8—8 until the stops 38, 39 come into mutual bearing contact, so that a pressure point can be felt on the manual-shift lever.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A shift device for a toothed change transmission of a motor vehicle, comprising a manual-shift lever, a shift finger operatively connected with the manual shift lever such that actuation of the manual-shift lever displaces the shift finger both in a selection plane containing a geometrical main axis for a housing part and in shift planes of the housing part lying transversely to the selection plane, and, with respect to the main axis, a pressure pin and a reaction sleeve arranged coaxially and displaceable axially relative both to one another and to the housing part, wherein the reaction sleeve, in a first direction of the main axis pointing from a first shift plane to an adjacent second shift plane, is supportable on one spring end of a pressure-point spring which is supportable with another spring end relative to an abutment motionally fixed relative to the housing part, and, in a second direction of the main axis pointing from the first shift plane to an adjacent third shift plane, is supportable on at least one reaction ball, and the reaction sleeve has an inclined face for bearing on the at least one reaction ball, the housing part having a radial guide face for supporting the at least one reaction ball in the second direction of the main axis and the pressure pin having an inclined face, located in a transition between a wide pin portion and a narrow pin portion adjoining in the second direction of the main axis, for support on the at least one reaction ball in the second direction of the main axis, such that the radial movability of the at least one reaction ball with respect to the main axis is limited radially outwardly by the inclined face of the reaction sleeve, and is limited radially inwardly when the shift finger is located in a region of the selection plane limited by the first and the second shift plane, by the narrow pin portion or when the shift finger is located in the third shift plane by the wide pin portion wherein the shift finger and the pressure pin are arranged movably relative to one another in the directions of the main axis, an abutment sleeve is operatively arranged between the abutment and the associated spring end of the pressure-point spring and is arranged displaceably in the directions of the main axis both relative to the housing part and relative to the pressure pin, the abutment sleeve having a first axial stop in bearing contact on the abutment when the shift finger is located in the second shift plane and, and the pressure pin having a corresponding axial stop to be second axial stop, and the two axial stops of the abutment sleeve being in mutual bearing contact when the shift finger is in a first region of the selection plane limited by the first and the third shift plane, and the shift finger and the abutment sleeve each having a cam, in mutual engagement when the shift finger is located in a second region of the selection plane limited by the second and by the third shift plane.

2. The shift device according to claim 1, wherein the abutment sleeve has a third axial stop, and the reaction sleeve has a corresponding stop, and the two stops are in mutual bearing contact when the shift finger is located in the third shift plane.

3. A shift device for a toothed change transmission of a motor vehicle, comprising a manual-shift lever, a shift finger operatively connected with the manual shift lever such that actuation of the manual-shift lever displaces the shift finger both in a selection plane containing a geometrical main axis for a housing part and in shift planes of the housing part lying transversely to the selection plane, and, with respect to the main axis, a pressure pin and a reaction sleeve are arranged coaxially and displaceable axially relative both to one another and to the housing part, wherein the reaction sleeve, in a first direction of the main axis pointing from a first shift plane to an adjacent second shift plane, is supportable on one spring end of a pressure-point spring which is supportable with its other spring end relative to an abutment motionally fixed relative to the housing part, and, in a second direction of the main axis pointing from the first shift plane to an adjacent third shift plane, is supportable on at least one reaction ball, and the reaction sleeve has an inclined face for bearing on the at least one reaction ball, the housing part having a radial guide face for supporting the at least one reaction ball in the second direction of the main axis and the pressure pin having an inclined face, located in a transition between a wide pin portion and a narrow pin portion adjoining in the second direction of the main axis, for support on the at least one reaction ball in the second direction of the main axis, such that the radial movability of the at least one reaction ball with respect to the main axis is limited radially outwardly by the inclined face of the reaction sleeve, and is limited radially inwardly when the shift finger is located in a region of the selection plane limited by the first and the second shift plane, by the narrow pin portion or when the shift finger is located in the third shift plane by the wide pin portion, a return spring is arranged concentrically to the main axis and is supportable with one spring end relative to an abutment motionally fixed relative to the housing part and with its other spring end relative to an abutment motionally fixed relative to the pressure pin, and a switching spring of a reversing-light switch is arranged coaxially to the main axis and configured to be actuatable by the pressure pin.

4. The shift device according to claim 3, wherein the abutment fixed relative to the pressure pin in terms of motion, for one spring end of the return spring is located on the narrow pin portion, and the other spring end can be supported directly on the abutment fixed relative to the housing.

* * * * *